United States Patent [19]

Ueno et al.

[11] 4,359,410

[45] Nov. 16, 1982

[54] PROCESS OF PRODUCING A CATALYST CARRIER

[75] Inventors: Hideaki Ueno, Okazaki; Fumiyoshi Noda, Toyota, both of Japan

[73] Assignee: Toyota Jidosha Kogyo Kabushiki Kaisha, Japan

[21] Appl. No.: 214,323

[22] Filed: Dec. 8, 1980

[30] Foreign Application Priority Data

Jul. 23, 1980 [JP] Japan ................................ 55/100759

[51] Int. Cl.[3] ................................................ B01J 21/04

[52] U.S. Cl. ........................................ 252/463; 423/628

[58] Field of Search .......................... 252/463; 423/628

[56] References Cited

U.S. PATENT DOCUMENTS

| | | | |
|---|---|---|---|
| 2,982,719 | 5/1961 | Gilbert et al. | 252/463 X |
| 3,839,230 | 10/1974 | Cobzaru | 252/463 |

*Primary Examiner*—W. J. Shine

*Attorney, Agent, or Firm*—Stevens, Davis, Miller & Mosher

[57] ABSTRACT

Catalyst carrier produced by a process of dehydrating alumina hydrate, granulating and roasting at 150°~850° C. to yield particles; and curing said particles in an aqueous solution of caustic alkali or in an aqueous solution of sodium aluminate or in a mixture of both under a saturated steam pressure of 120°-200° C.; and said manufacturing process.

5 Claims, 8 Drawing Figures

F I G. 5
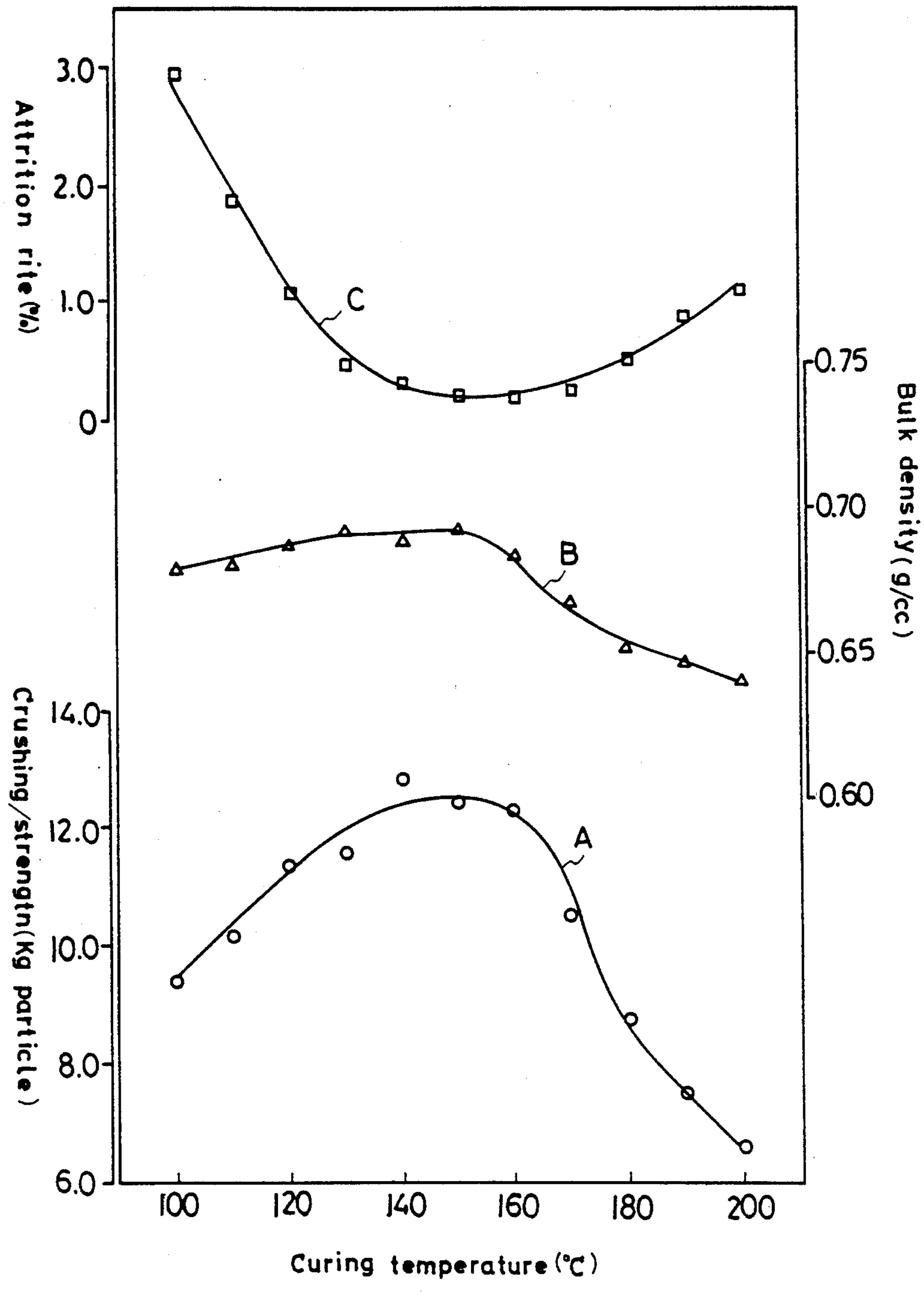

F I G . 7
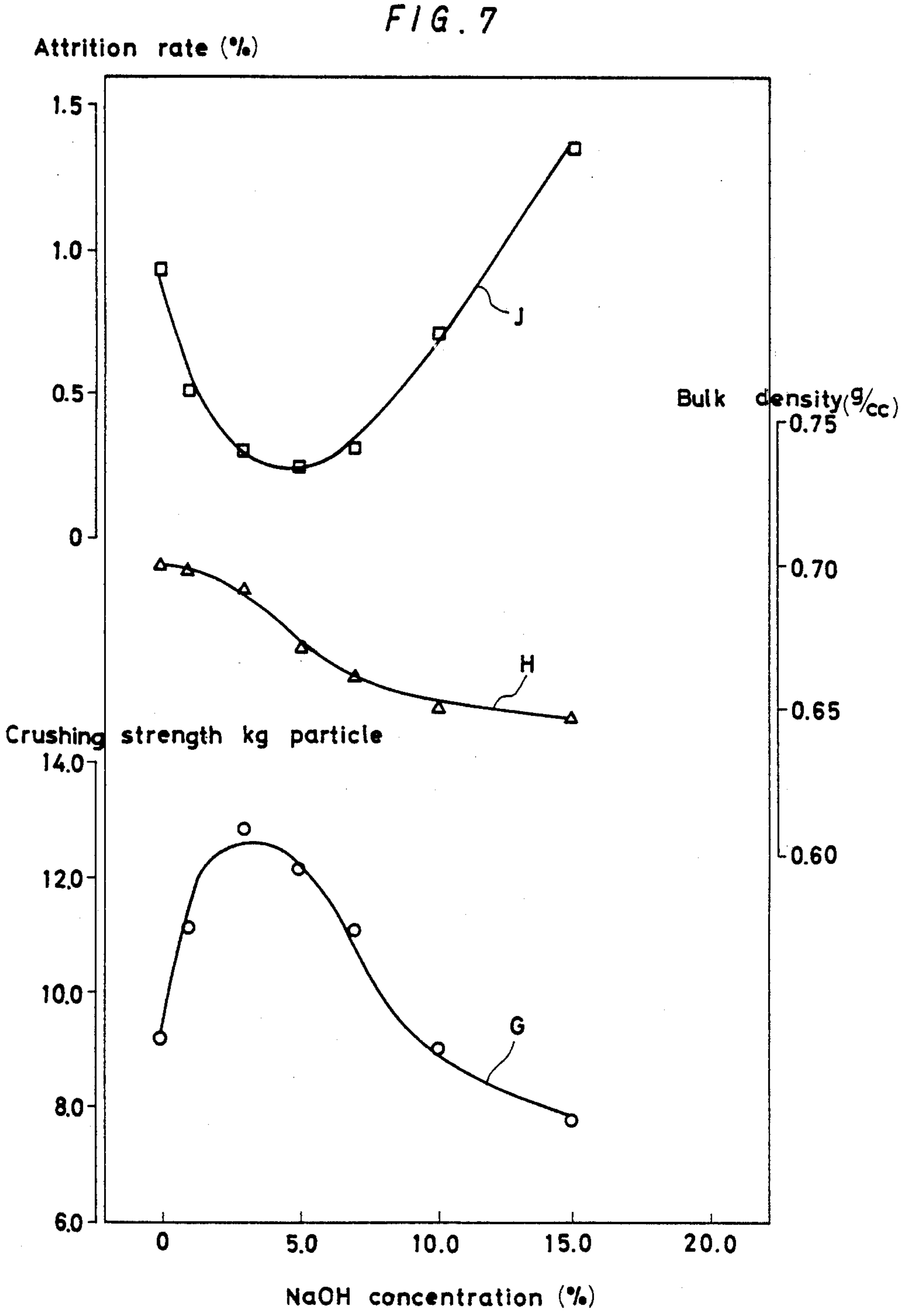

PROCESS OF PRODUCING A CATALYST CARRIER

BACKGROUND OF THE INVENTION (1) Field of the Invention

The present invention relates to a highly strong, highly attrition-resistant alumina catalyst carrier and its manufacturing process.

(2) Prior Art

It is well-known that a catalyst in which platinum or the like as catalytic element is carried on a carrier of alumina or the like has been in use for purification of auto exhaust gas. This catalyst is required not only to function as such, but also to have a certain level of warm-up ability and attrition-resistance, because it has to be able to become normally effective within a specific time after engine starts and also has to be able to endure the running vibration. The catalyst carrier usually meets these requirements.

Alumina-base catalyst carrier has been found as the one which best exhibits an excellent performance as the catalyst. Its conventional manufacturing process consists in partially dehydrating aluminum hydroxide as obtained by the Bayer process; crushing or granulating the product; and then curing it under saturated steam pressure followed by drying and firing. However, if the catalyst carrier thus produced is to have a strength above a specific level, its density must be increased, which will increase the catalyst weight. Meanwhile, an increased density will heavily decrease the warm-up ability of the catalyst bed.

The present invention provides a catalyst carrier free from the above-mentioned defects, which excels both in warm-up ability and in attrition-resistance, and its manufacturing process.

SUMMARY OF THE INVENTION

The object of the present invention is to provide an alumina-base catalyst carrier obtained with both high strength and excellent attrition-resistance by performing calcination-curing under specific temperature conditions, and its manufacturing process.

These and other features of the present invention will become apparent from the following description in reference to the accompanying drawings.

BRIEF DESCRIPTION OF THE DRAWINGS

FIG. 5 is a diagram illustrating the relationship of the curing temperature vs. the attrition rate, the crushing strength and the bulk density of alumina particles obtained in Example 3.

FIG. 7 is a diagram illustrating the relationship of the concentration of the curing liquid (aqueous solution of NaOH) for the alumina particles obtained in Example 5 vs. the attrition rate, the crushing strength and the bulk density thereof.

DETAILED DESCRIPTION OF THE INVENTION

Figure 1:
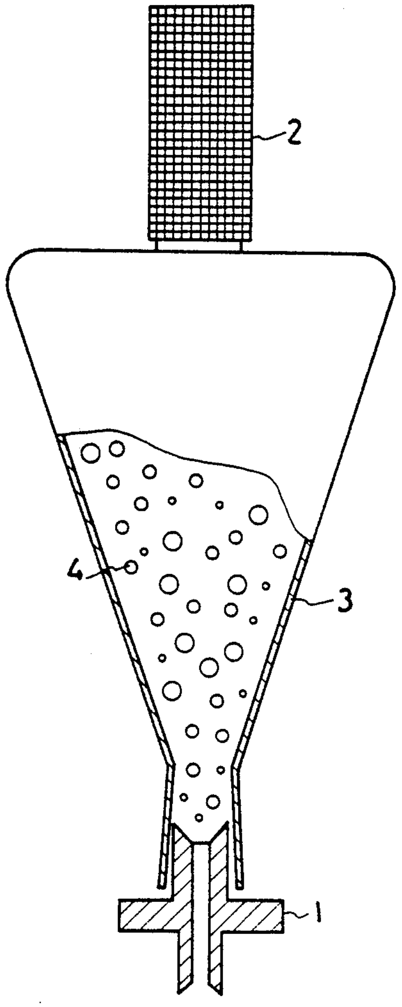
FIG. 1 is a partially fragmentary section view of an attrition testing machine.

The process according to the present invention is characterized in that alumina hydrate is dehydrated; it is then granulated as it is, or granulated after crushing, then calcined, at 150°–850° C.; and the particles thus obtained are cured in an aqueous solution of caustic alkali or in an aqueous solution of sodium aluminate under a saturated steam pressure of 120°–200° C., followed by drying and firing. Further the process can include a rinsing with water to eliminate Na or K contained in the obtained alumina particles.

The starting material in this process is alumina hydrate produced by Bayer process, more popularly aluminum hydroxide.

The dehydration step is done for 1–10 seconds of contact with, say, a hot stream of 500°–1,000° C., the lg loss of alumina powder after dehydration (percentage of water content including water of crystallization after dehydration) being desirably 5–20%.

After dehydrating, crushing of dehydrated alumina is done by, say, a vibrating mill, yielding 5–10μ particles. Fine crushing of alumina in this step will assure uniform density of particles in the subsequent granulation step with only minor variance of quality. When the starting material is already fine, this step may be omitted.

Next, granulation is done by routine method using a rotatable dish, a rotatable drum or by a method of extrusion and spherical granulation, the particle size being 1.0–10 mmϕ, preferably 2.0–4.0 mmϕ.

The particles thus produced are calcined for 1–20 hours at 150°–850° C. The calcination can be done in a common drying furnace or firing furnace. If the calcining temperature is below 150° C. or over 850° C., the particles will not have sufficient improvement in quality.

Curing is excecuted in an aqueous solution of caustic alkali, say, KOH, NaOH or $Ba(OH)_2$, in an aqueous solution of sodium aluminate, in an aqueous solution of carbonate salts such as sodium carbonate or in a mixture of these solutions, for 1–20 hours under a saturated steam pressure of 120°–200° C. The adequate concentration (in weight percent) of the aqueous solution of NaOH is 1–10%, preferably 1–7%; and the adequate concentration of the aqueous solution of KOH is 3–15%, preferably 5–12%. The adequate concentration of the aqueous solution of sodium aluminate is 1–15%, preferably 5–15%, more preferably 10% or thereabout. A mixture of the aqueous solutions of caustic alkali and sodium aluminate may be used; their mixing ratio can be arbitrary and their concentrations are desirable ones respectively for the caustic alkali and sodium aluminate solutions. Curing duration differs somewhat depending on the kind and concentration of aqueous solution used; for example 10 hours will be adequate in the case of a 3% NaOH aqueous solution under a saturated steam pressure of 150° C. and 7 hours will be adequate in the case of a 7% KOH aqueous solution under a saturated steam pressure of 160° C.

Drying lasts, say, 3 hours at 150° C., followed by 3 hours of firing at 800° C. These conditions, however, are not limiting ones; for example, drying may be done for about 3 hours at 90°-300° C. and firing may be done for about 3 hours at 600°-1,100° C. And if a firing furnace is properly employed, drying and firing can be done using the same furnace.

Rinsing of alumina particles for removal of Na or K contained therein is done, for instance, by about 30 minutes of washing with a warm water at a rate of 5 liters per one liter of the particles. This step may follow the firing of the particles and in that case the step will be more effective. If there is no need to eliminate Na or K, this step can be omitted.

The materials available for this process are commercial alumina hydrate produced by Bayer process, particularly particles solely composed of $Al_2O_3.3H_2O$; or mixtures of $Al_2O_3.3H_2O$ with other additives such as $CeO_2$, $MgO$; rare earth oxides like $Ce_2O_3$, $La_2O_3$ and other oxides like $FeO$, $Fe_3O_4$, $Fe_2O_3$, $MnO_2$, $Mn_2O_3$, $Cr_2O_3$, $TiO_2$, $CuO$, $Cu_2O$, $CoO$, $CO_2O_3$, $CoO_2$, or $NiO$. Besides, organic compounds such as cellulose may be available, crystalline cellulose being preferable among them.

The catalyst carrier obtained by the invented process, carrying base metals such as Fe, Cu, Ni, W, Re as well as precious metals such as platinum, palladium and rhodium, can serve as a practical catalyst.

Next, the invented process is described in detail referring to practical examples.

EXAMPLE 1

Powder of aluminum hydroxide of 40μ in average size as produced by Bayer process was partially dehydrated (with Ig loss 8%); crushed to average size of 12μ, and granulated to alumina particles of 2.8-4.0 mm in a dish-type granulating machine.

These obtained particles were calcined for 3 hours at different temperatures in the range of 100°-1000° C., followed by curing in a 10% $NaAlO_2$ aqueous solution. The curing was carried out for 10 hours under a saturated steam pressure at 150° C. The particles thus cured were rinsed to remove a deposit or a solid solution of $Na^+$, thereby reducing the Na content therein to less than 0.3% as $Na_2O$. Then the particles were dried for 3 hours at 150° C. and reactivated through 3 hours of firing at 800° C.

The properties of active alumina particles thus activated were investigated as follows.

(1) Measurement of crushing strength

Using a Kiya-type hardness gauge, the strength of the active alumina particles was measured and the values for 20 particles were averaged as the crushing strength.

(2) Measurement of bulk density

A 100 cc messcylinder was charged with about 40 cc of active alumina particles and from their volume and weight, the bulk density was calculated.

(3) Measurement of attrition rate

The measurement was done using an attrition testing machine illustrated in FIG. 1. First, 55 cc of active alumina particles were fired for about 1 hour at 550° C. and thereafter their weight was measured as $W_1$. Next this sample was taken into the attrition testing machine consisting of a conical glass tube of height 230 mm, top angle 90°, maximum diameter 130 mm, and minimum diameter 20 mm. Air was sent into the attrition tube 3 through the nozzle 1, thereby causing alumina particles 4 to be subjected to attrition movement for 5 minutes. The air sent into the attrition tube 3 was discharged out of the system through a metal-screen cap 2 at the top. Thereupon the particles were taken out of the attrition tube 3 and fired for 1 hour at 550° C., followed by measurement of weight as $W_2$. Using $W_2$, the attrition rate was calculated as follows:

$$\text{Attrition rate (\%)} = \frac{W_1 - W_2}{W_1} \times 100$$

Figure 2:
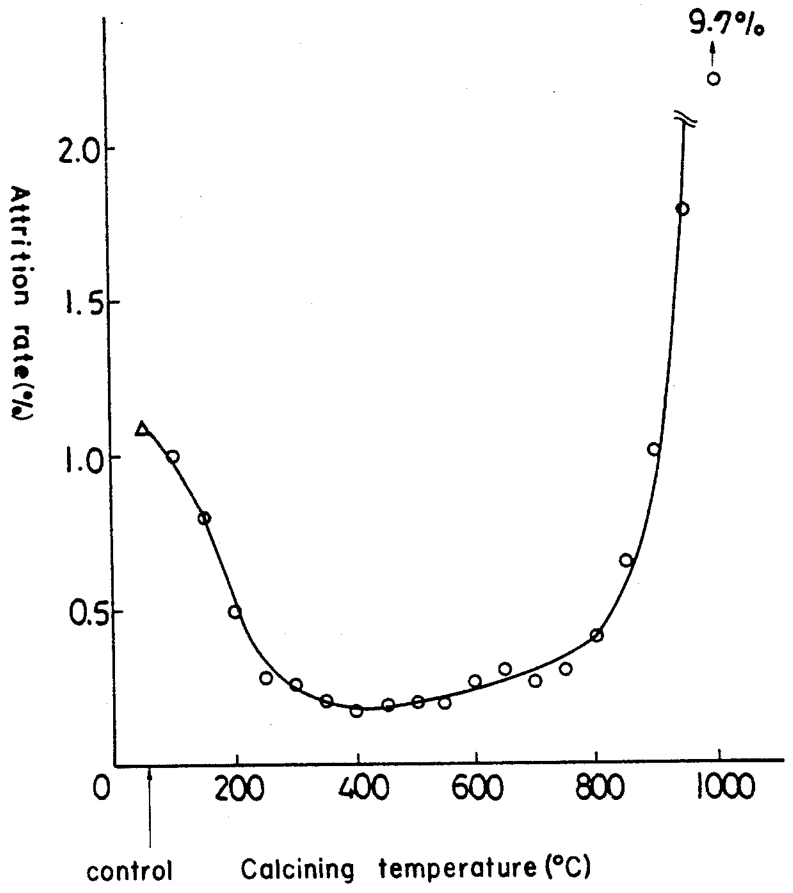
FIGS. 2, 3 and 4 are diagrams respectively illustrating the relationships of the calcinating temperature vs. the attrition rate, the crushing strength and the bulk density of alumina particles obtained in Example 1 and control particles.
Figure 3:
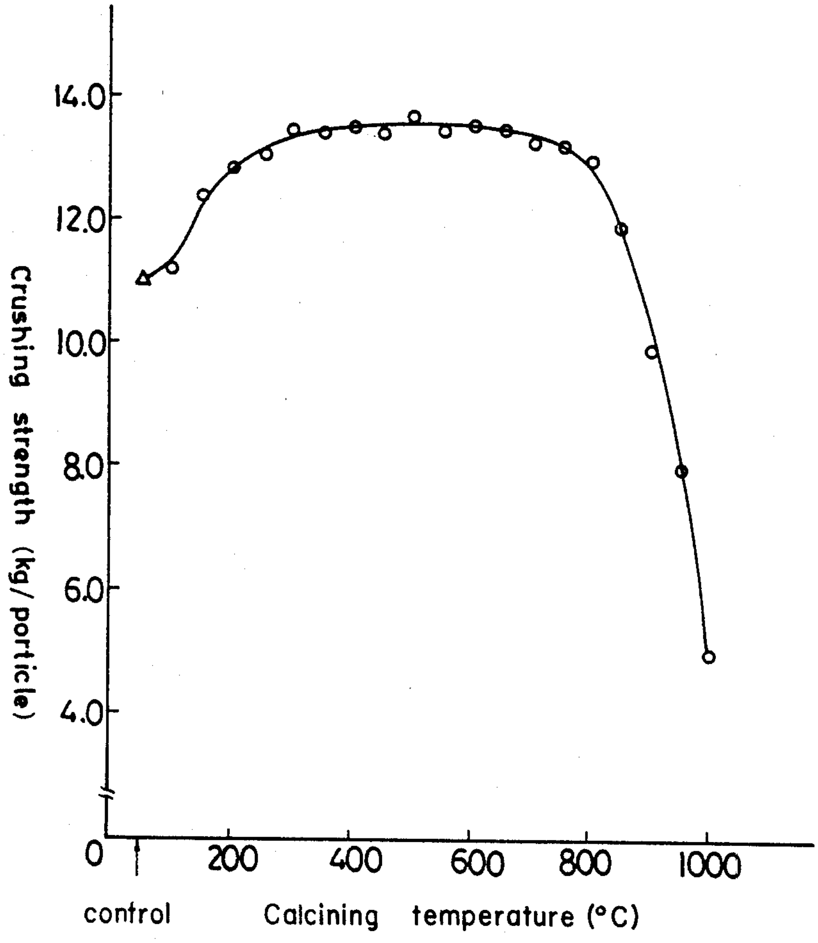
Figure 4:
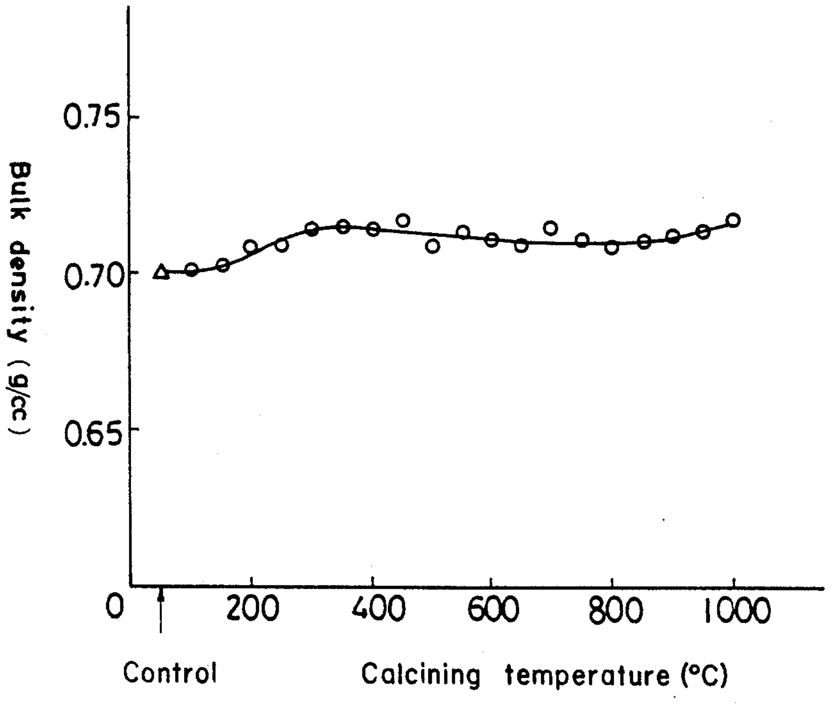

The results obtained are summarized in FIGS. 2, 3 and 4, where also the properties of control alumina particles cured in $NaAlO_2$ aqueous solution without calcination are shown.

FIG. 2 illustrates the relation between the calcination temperature of alumina particles before curing and their attrition rate. FIGS. 3 and 4 illustrate the relationship between the calcination temperature and the crushing strength and the relationship between the calcination temperature and the bulk density. It is evident from these figures that the properties of the particles improve when they are calcined in the range of 150°-850° C.; if the temperature is lower than 150° C., the calcinating is less effective and the properties of particles obtained are hardly better than those of control particles produced by the conventional method. If the temperature is higher than 850° C., these properties of the particles will be equal or even inferior to those of control particles.

EXAMPLE 2

The process was the same as in Example 1, except that the curing after calcination was done at 150° C. for 10 hours in a 3% NaOH aqueous solution. The properties of the particles obtained turned out the same as those illustrated in FIGS. 2, 3 and 4.

EXAMPLE 3

Aluminum hydroxide of 40μ in average size as produced by Bayer process was partially dehydrated; crushed to 12μ in average size; and then granulated to particles of 2.8-4.0 mmφ by a dish-type granulating machine. After 10 hours of calcining at 350° C., these particles were cured for 10 hours in a 3% NaOH aqueous solution under a saturated steam pressure in the range of 100°-200° C. Alumina particles thus cured at different temperatures were rinsed for removal of a deposit or a solid solution of $Na^+$, yielding less than 0.3% as $Na_2O$ from Na content of the particles. Thereafter, the particles were dried for 3 hours at 150° C. and then fired for 3 hours at 800° C. to reactivate them. The properties of the active alumina particles thus produced were investigated in the same way as in Example 1.

The results are summarized in FIG. 5, in which the curve A shows the relation of the curing temperature vs. the crush strength, the curve B that of the curing temperature vs. the bulk density and the curve C that of the curing temperature vs. the attrition rate. From this diagram it is understood that the adequate curing temperature is 120°-200° C., desirably 130°-180° C.

EXAMPLE 4

Alumina hydroxide of 1μ in average size as produced by Bayer process was partially dehydrated. A mixture was prepared from 70 weight % of the obtained alumina powder and 30 weight % of crystalline cellulose. This mixture was granulated to particles of 2.8-4.0 mmφ in a dish-type granulating machine. There particles were fired for 10 hours at 400° C. and then cured in $NaAlO_2$ aqueous solutions of 0–20% concentrations. The curing was done for 10 hours under a saturated steam pressure of 150° C. The cured particles were rinsed to render the Na content in the praticles into less than 0.3% as $Na_2O$. Thereupon, the particles were submitted to 3 hours of drying at 150° C., followed by 3 hours of firing at 800° C. to reactivate them.

The active alumina particles thus produced were investigated for their properties in the same way as in Example 1.

Figure 6:
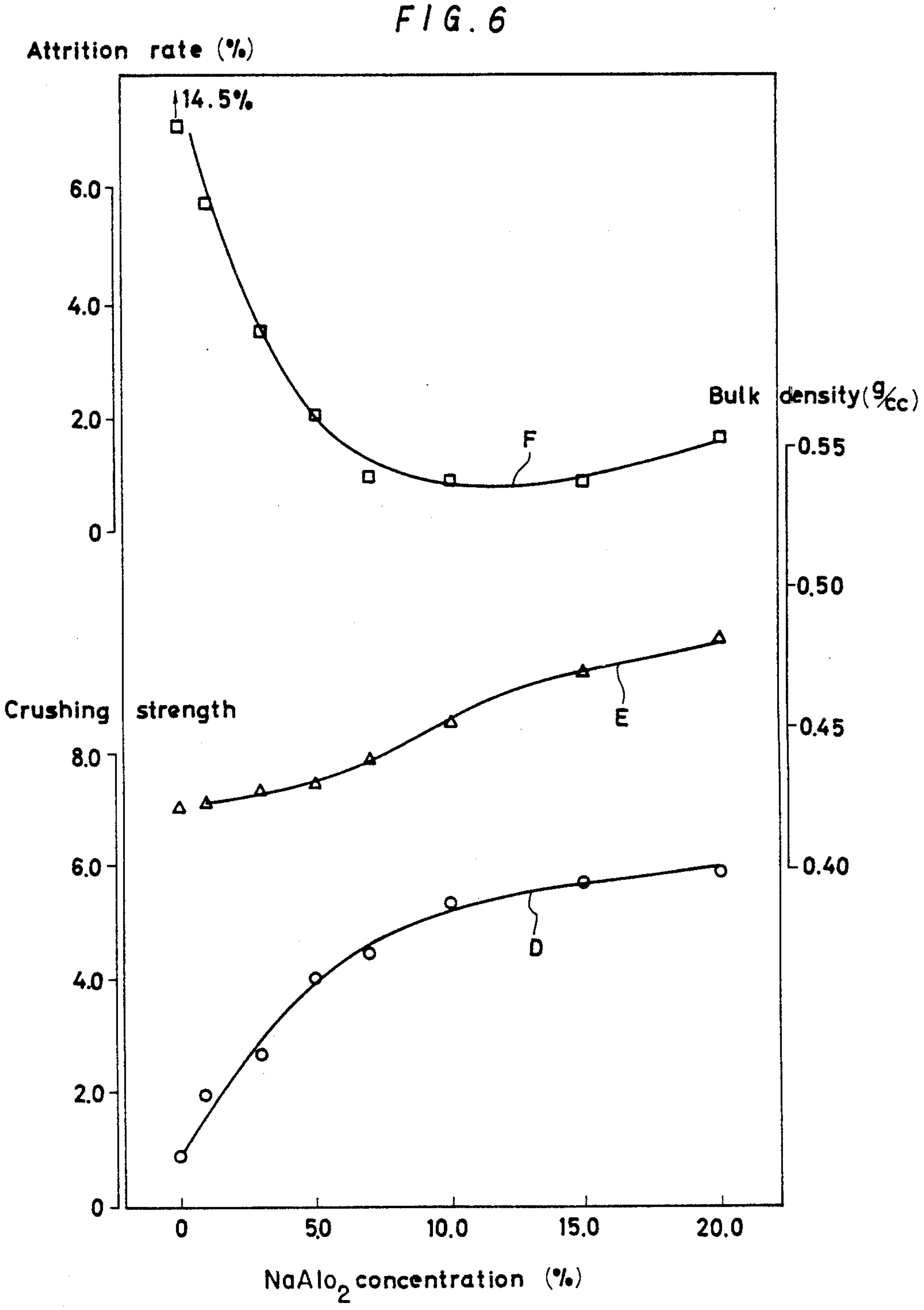
FIG. 6 is a diagram illustrating the relationship of the concentration of the curing liquid (aqueous solution of $NaAlO_2$) for the alumina particles obtained in Example 4 vs. the attrition rate, the crushing strength and the bulk density thereof.

The results are summarized in FIG. 6, in which the curve D shows the relation of the $NaAlO_2$ concentration vs. the crushing strength, the curve E does that of the $NaAlO_2$ concentration vs. the bulk density and the curve F that of the $NaAlO_2$ concentration vs. the attrition rate. From this diagram, it is seen that the properties of the particles improve when the $NaAlO_2$ concentration is more than 1%. Meanwhile, even if the $NaAlO_2$ concentration is increased to more than 15%, hardly any improvement occurs in the crushing strength and the attrition rate and only the bulk density increases. Thus an increase of the $NaAlO_2$ concentration to more than 15% will be needless both from the standpoint of the properties and from that of economy.

From the above, it can be said that the adequate concentration of $NaAlO_2$ aqueous solution is 1–15%, preferably 5–15%.

EXAMPLE 5

Aluminum hydroxide of 40μ in average size as produced by Bayer process was partially dehydrated; crushed to 12μ in average size; and then granulated to alumina particles of 2.8–4.0 mmφ in a dish-type granulating machine. There particles were calcined for 10 hours at 350° C. and then cured in NaOH aqueous solutions of 0–15% concentrations. The curing was done for 10 hours under a saturated steam pressure of 150° C. Cured particles were washed to render the Na content in them into less than 0.3% as $Na_2O$. Thereupon, the particles were dried for 3 hours at 150° C. and then fired for 3 hours at 800° C. to reactivate them.

In the same way as in Example 1, the obtained active alumina particles were investigated for their properties.

The results of investigation are summarized in FIG. 7, in which the curve G shows the relation of the NaOH concentration vs. the crushing strength, the curve H does that of the NaOH concentration vs. the bulk density and the curve J that of the NaOH concentration vs. the attrition rate. From this diagram, it is evident that the curing in NaOH aqueous solution can best be done at the NaOH concentration in the range of 1–10%.

EXAMPLE 6

Aluminum hydroxide of 40μ in average size as produced by Bayer process was partially dehydrated; crushed to 12μ in average size and then granulated to alumina particles of 2.8–4.0 mmφ in a dish-type granulating machine. These particles were calcined for 5 hours at 400° C. and then cured in KOH aqueous solutions of 0–20% concentrations. The curing was done for 7 hours under a saturated steam pressure of 160° C. The particles cured were washed to render the K content in them to less than 1.0% as $K_2O$. Thereupon, the particles were dried for 3 hours at 150° C. and then fired for 3 hours at 800° C. to reactivate them. The properties of the active alumina particles thus obtained were investigated in the same way as in Example 1.

Figure 8:
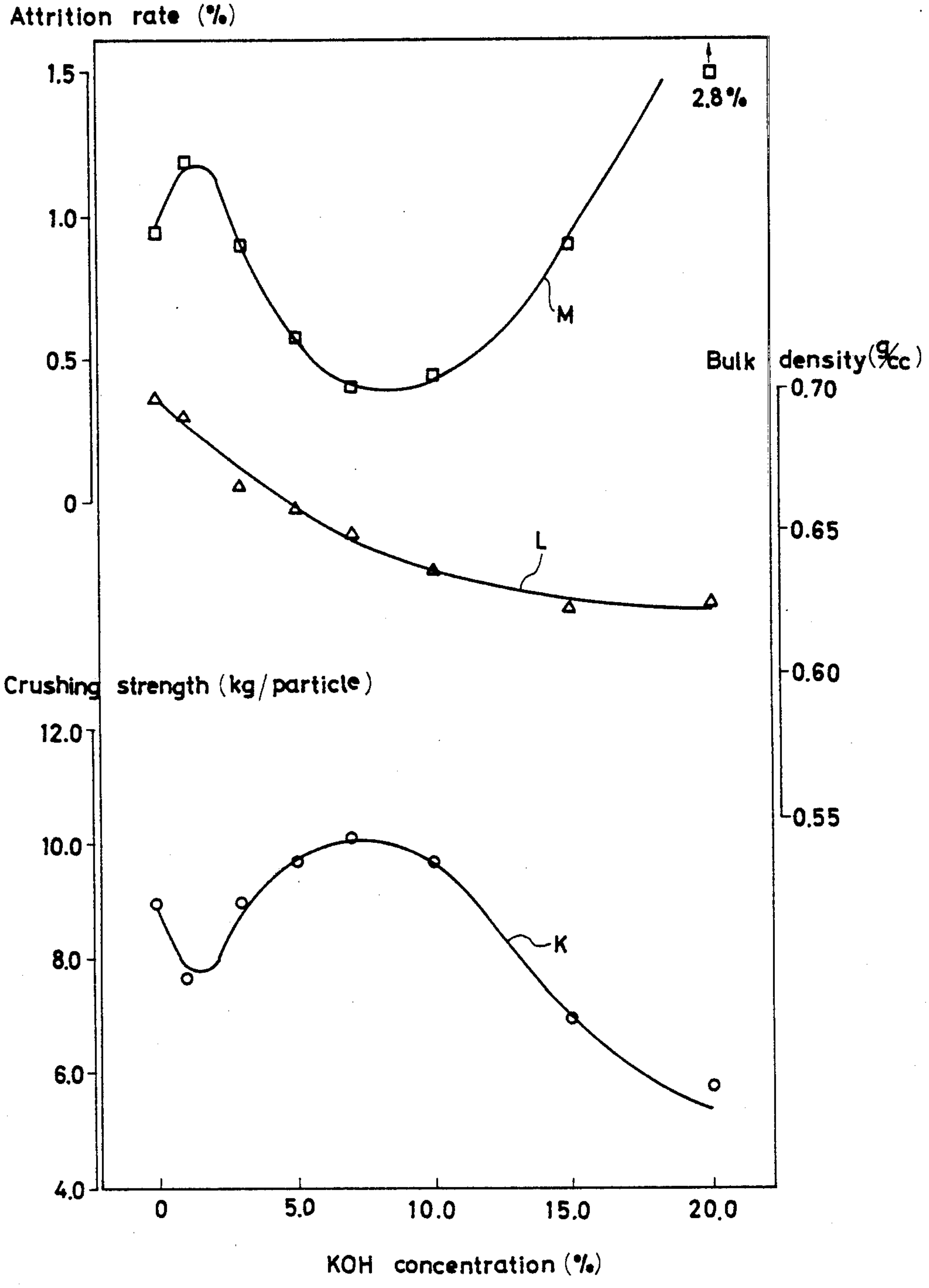
FIG. 8 is a diagram illustrating the relationship of the concentration of the curing liquid (aqueous solution of KOH) for the alumina particles obtained in Example 6 vs. the attrition rate, the crushing strength and the bulk density thereof.

The results of investigation are summarized in FIG. 8, in which the curve K shows the relation of the KOH concentration vs. the crushing strength, the curve L does that of the KOH concentration vs. the bulk density and the curve M that of the KOH concentration vs. the attrition rate. From this diagram, it is seen that for the curing in KOH aqueous solution, the desirable KOH concentration is 3–15%.

EXAMPLE 7

Aluminum hydroxide of 40μ in average size as produced by Bayer process was partially dehydrated; crushed to 12μ in average size; and thereafter a mixture was prepared from 70 weight % of the obtained alumina powder and 30 weight % of crystalline cellulose. This mixture was granulated to particles of 2.8–4.0 mmφ in a dish-type granulating machine. There particles were calcined for 10 hours at 400° C. and then cured in an aqueous solution with 2% NaOH and 5% $NaAlO_2$ content. The curing was done for 10 hours under a saturated steam pressure of 150° C. The particles were then rinsed with water to render the Na content in them into less than 0.3% as $Na_2O$, followed by 3 hours of drying at 150° C. and 3 hours of firing at 800° C. to reactivate them. The results of investigating the properties of these particles in the same way as in Example 1 are summarized in Table 1, together with the properties of control particles cured in water.

TABLE 1

| Alumina particles | Properties: Crushing strength | Attrition rate | Bulk density |
|---|---|---|---|
| Example 7 | 5.2 kg/particle | 0.9% | 0.45g/cc |
| Control | 1.4 kg/particle | 11.3% | 0.43g/cc |

EXAMPLE 8

Aluminum hydroxide of 40μ in average size as produced by Bayer process was partially dehydrated; crushed to 12μ in average size and then granulated to alumina particles of 2.8–4.0 mmφ in a dish-type granulating machine. These particles were calcined for 10 hours at 350° C. and then cured in a 3% NaOH aqueous solution. The curing was done for 10 hours under a saturated steam pressure of 150° C. Next, the same particles were submitted to drying at 150° C. for 3 hours, followed by firing at 500° C. for 3 hours. The fired particles were washed with water of over 70° C. for 30 minutes, the particles/water ratio being 1 liter to 5 liters. After 10 cycles of this step, the same particles were dried for 3 hours at 150° C. and then fired for 3 hours at 800° C. The Na content in these particles turned out 0.1% as $Na_2O$.

Meanwhile, the as-cured particles were washed for 30 minutes with water of over 70° C., the particles/water ratio being 1 liter/5 liters. After 10 cycles of this step, the same particles were dried for 3 hours at 150° C. and then fired for 3 hours at 800° C. The Na content in said particles turned out 0.21% as $Na_2O$.

From the above results, it can be said that the removal of Na in particles can more efficiently be done after their firing than after their curing.

It is apparent from these examples that according to the present invention, a catalyst carrier stronger and more attrition-resistant than one produced by the conventional process can be obtained. Thus the carrier obtained by the invented process is highly favourable for weight reduction and warm-up ability, because its density can be made smaller than that of the conventional carrier for the same strength and the same attrition-resistance.

We claim:

1. A process of producing a catalyst carrier, comprising the steps of:

(a) dehydrating alumina hydrate;

(b) granulating the alumina obtained from step a;

(c) calcining the granules obtained in step b at from about 150° C. to 850° C.;

(d) curing the granules calcined in step c in an aqueous solution of one or more members selected from the group consisting of $NaAlO_2$, NaOH, KOH, $Ba(OH)_2$, and a carbonate salt under saturated steam pressure at from about 120° C. to 200° C.; and (e) drying and firing the product of step d.

2. The process of claim 1, wherein said curing is done in an aqueous solution of $NaAlO_2$ having an $NaAlO_2$ concentration of from about 1 to 15% by weight.

3. The process as claimed in claim 1, wherein said curing step is done in an aqueous solution of NaOH having an NaOH concentration of from about 1 to 10% by weight.

4. The process as claimed in claim 1, wherein said curing step is done in an aqueous solution of KOH having a KOH concentration of from about 3 to 15% by weight.

5. The process of claim 1, further comprising washing the product of step e with hot water, followed by a further drying and firing step.

* * * * *